3,027,377
NEW VAT DYES
William Baptist Hardy, Bound Brook, Isaiah Von, Somerville, and Andrew Stephen Tomcufcik, Bound Brook, N.J., assignors to American Cyanamid Company, New York, N.Y., a corporation of Maine
No Drawing. Filed June 8, 1953, Ser. No. 360,335
7 Claims. (Cl. 260—274)

This invention relates to new vat dyestuffs having the formula:

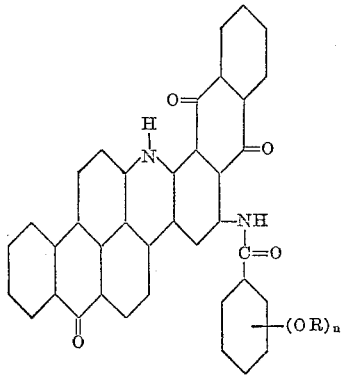

in which R is an alkyl group of less than five carbon atoms and $n$ is 1 or 2. These compounds are derivatives of 4 - amino - Bz - 1' - (alphanthraquinonylamino)benzanthrone-2,2'-acridine, which will be referred to in the specification more simply as benzanthrone anthraquinone acridine.

Dyestuffs for the dyeing of military uniforms present a serious problem. The enormous increase in fire power in modern warfare make it imperative for soldiers to blend into the terrain so that they are either unobserved or present relatively poor targets. The art of camouflage resulted in the development of uniforms having colors which blend into the average landscape. During the Second World War, observation by means of infrared radiation completely changed the problem of camouflage because, while dyes of excellent fastness and dull drab shades under visible light were generally used for the dyeing of uniforms, all of the fast dyes with otherwise desirable properties showed high reflectance in the infrared and therefore soldiers wearing uniforms dyed with these dyes, when observed under infrared radiation, for example by means of devices such as snooperscopes and sniperscopes, stood out against average terrain making discovery easy and presenting excellent targets.

Extensive investigations have shown that to be effective under infrared observation, dyed fabrics must show an infrared reflectance which is relatively low, preferably about 25%, but which of course should not be too low. In other words in average terrain, a soldier to be effectively concealed or to present a poor target should appear no lighter than the background and while it is undesirable that a soldier should appear much darker, any difference in infrared reflectance from that of the terrain should be on the darker rather than on the lighter side.

There are known some dyes, for example some sulfur dyes, which exhibit low infrared reflectance. These dyes, however, have such inferior fastness to light and to the rather drastic washing conditions in the field that they are not practical. On the other hand, vat dyes which show satisfactory light and wash fastness have, in the past, also shown high infrared reflectance. The need for vat dyes of low infrared reflectance and satisfactory fastness properties has therefore been unfulfilled, both for use as the only dyes for uniforms and for use in blends with small amounts of other dyes of higher infrared reflectance.

The dyestuffs of the present invention combine low infrared reflectance with a satisfactory shade in visible light and with good fastness properties. They are particularly useful in blends to produce shades desired for uniforms. It is not known why the presence of one or more alkoxy groups should so markedly change the properties of the dyestuff and result in improved fastness, particularly light fastness. No theory is therefore advanced in the present case as to why the superior light fastness results.

It is an advantage of the present invention that the dyestuffs can be prepared very easily by acylating 4-aminobenzanthrone anthraquinone acridine with suitable alkoxybenzoyl halides or anhydrides. Typical acylating agents are the anhydrides or halides of o-, m- or p-methoxybenzoic acid, o- or p-ethoxybenzoic acid, o- or p-propoxybenzoic acid, m-butoxybenzoic acid, p-isopropoxybenzoic acid, and the like. Certain of the acylating agents, notably m-butoxybenzoylchloride, are in themselves new chemical compounds.

The process of acylation follows general acylating practice, the reaction preferably being effected in an inert solvent, such as an aromatic hydrocarbon of the benzene or naphthalene series or their halogen or mononitro derivatives. When the alkoxybenzoyl halide is used, hydrochloric acid is given off in the reaction and it is advantageous to include in the reaction mixture an acid-binding agent, which may be any of the usual ones such as pyridine or other heterocyclic bases, soda ash or the like. The reaction proceeds smoothly and good yields are obtained.

The invention will be illustrated in greater detail in conjunction with the following specific examples, the parts being by weight unless otherwise specified.

*Example 1*

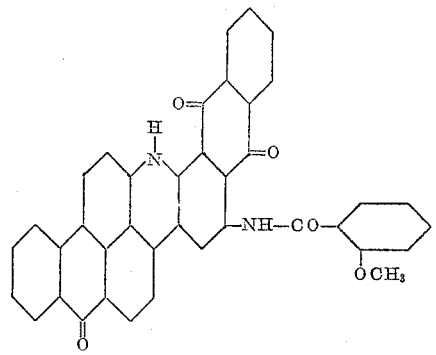

A mixture of 23.2 parts of 4-aminobenzanthrone anthraquinone acridine, 300 parts of nitrobenzene, 2.5 parts of pyridine, and 17.1 parts of o-methoxybenzoyl-chloride is stirred at 150° C. until the reaction is substantially complete. The mixture is allowed to cool below 80° C. and is then diluted with 1000 parts of alcohol.

The mixture is allowed to stir until precipitation is complete and is then filtered. The filter cake is washed thoroughly with alcohol and then slurried in 250 parts of pyridine. The slurry is boiled and then cooled to room temperature. The product is isolated by filtration and is washed with alcohol. The product dyes cellulose fibers an olive shade of good fastness and low infrared reflectance.

*Example 2*

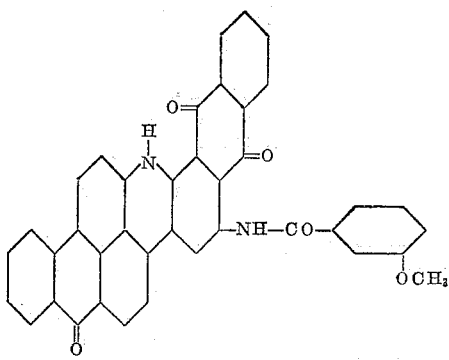

The procedure of Example 1 is followed using m-methoxybenzoyl chloride rather than o-methoxybenzoyl chloride. The product is isolated by a similar procedure in 85% yield. It dyes cellulose fibers olive shades somewhat yellower than the product of Example 1. The fastness properties and the infrared absorption are very good.

*Example 3*

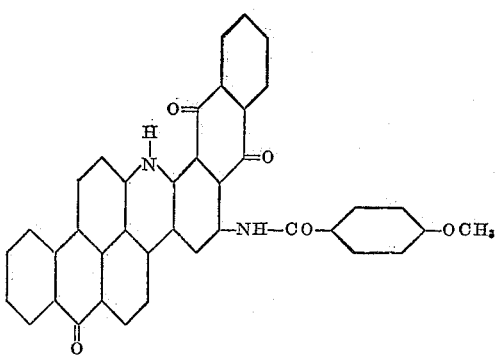

The procedure of Example 1 is followed using p-methoxybenzoyl chloride in place of the ortho isomer. The product is purified and isolated in the same manner. It dyes cellulose fibers an olive shade bluer than the product of Example 1, of good fastness properties and of low infrared reflectance. It dissolves in sulfuric acid to give a brown solution.

*Example 4*

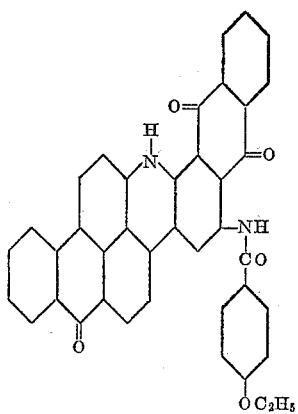

The procedure of Example 1 is followed using p-ethoxybenzoyl chloride rather than o-methoxybenzoyl chloride. The product is isolated by a similar procedure in 86% yield. It dyes cellulose fibers somewhat yellower in shade than the product of Example 1. The fastness properties and infrared absorption are both excellent.

*Example 5*

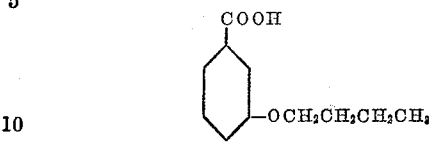

23.9 parts of methyl m-hydroxybenzoate are dissolved in 120 parts of methyl alcohol and then added to a solution of sodium methylate in methyl alcohol prepared by the addition of 4.5 parts of sodium to 160 parts of methyl alcohol. To this mixture are added 40 parts of n-butyl iodide, and the mixture is then refluxed for eighteen hours. The reaction mixture is then drowned in a solution of 80 parts of potassium hydroxide in 400 parts of water. The drowned mixture is boiled until a completely clear solution is obtained. Careful acidification of this solution precipitates m-(n-butoxy)benzoic acid as a white solid, which is filtered off, washed neutral with cold water, and dried. The m-(n-butoxy)benzoic acid may be further purified by recrystallization from a water-ethyl alcohol mixture. It melts at 59–60° C.

*Example 6*

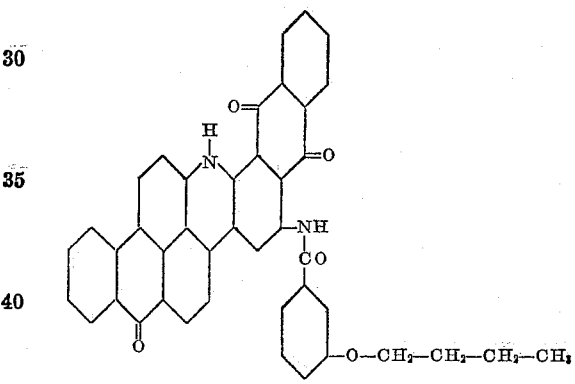

The procedure of Example 1 is followed using m-(n-butoxy)benzoyl chloride (obtained from m-(n-butoxy) benzoic acid by the action of thionyl chloride) rather than the o-methoxybenzoyl chloride. The product is isolated in good yield. It dyes cellulose fibers olive shades somewhat yellower than those obtained from the product of Example 1. The fastness properties and the infrared absorption are both very good.

*Example 7*

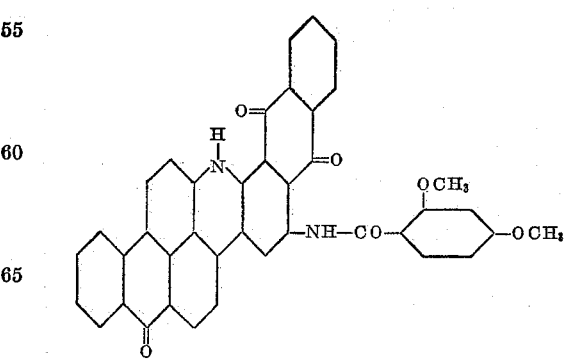

The procedure of Example 1 is followed with the exception that the o-methoxybenzoyl chloride is replaced by the acid chloride obtained by the action of thionyl chloride on 40 parts of 2,4-dimethoxybenzoic acid. This product dyes cellulose fibers in olive shades of good fastness properties and low infrared reflectance.

We claim:
1. Compounds of the formula:

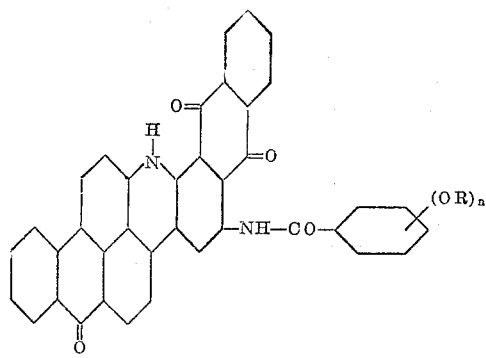

in which R is an alkyl group of less than five carbon atoms and n is an integer greater than 0 and less than 3.

2. Compounds of the formula:

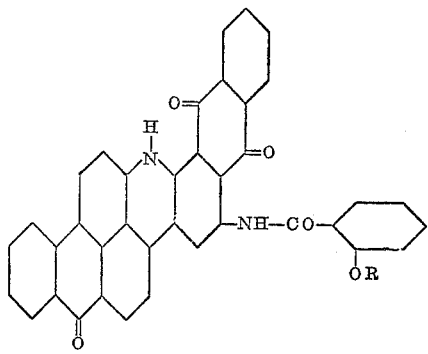

in which R is an alkyl group of less than five carbon atoms.

3. Compounds of the formula:

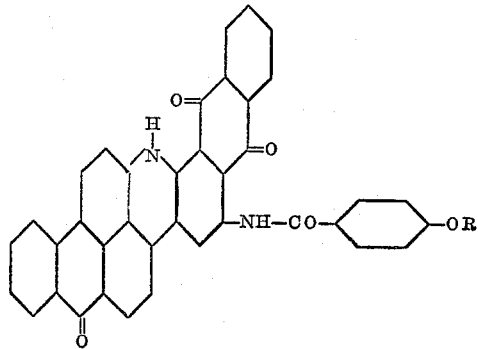

in which R is an alkyl group of less than five carbon atoms.

4. The compound of the formula:

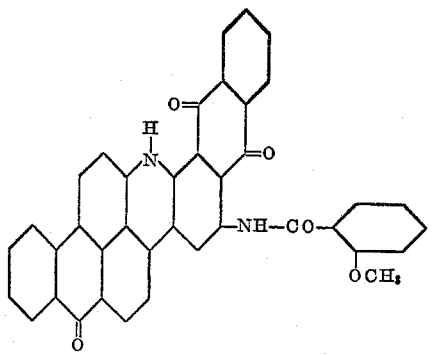

5. The compound of the formula:

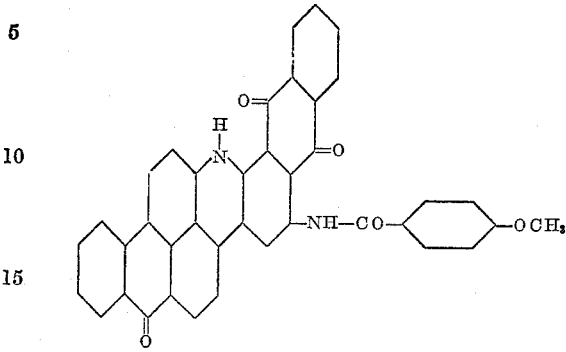

6. The compound of the formula:

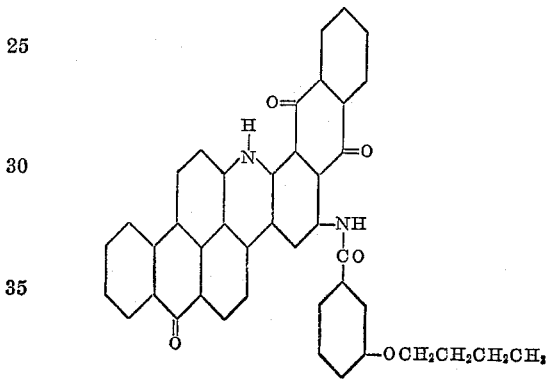

7. The compound of the formula:

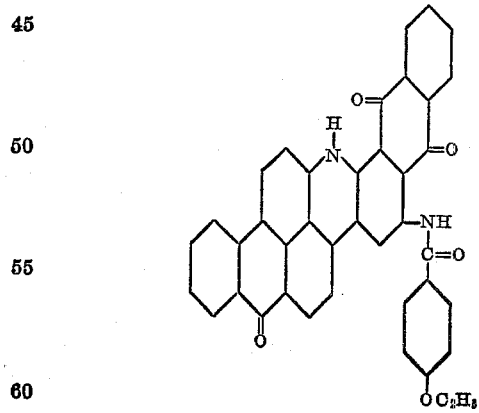

References Cited in the file of this patent
UNITED STATES PATENTS

| | | |
|---|---|---|
| 1,557,154 | George | Oct. 13, 1925 |
| 1,850,562 | Neresheimer et al. | Mar. 22, 1932 |
| 2,635,114 | Schlatter | Apr. 14, 1953 |

OTHER REFERENCES

Pierce et al.: J.A.C.S., vol. 64, pages 1691–4 (1942).
Jones: Journ. Chem. Soc. London, 1943, pages 430–2.